United States Patent
Taguchi et al.

(10) Patent No.: US 8,714,823 B2
(45) Date of Patent: May 6, 2014

(54) SLIDING BEARING

(75) Inventors: Yukiyasu Taguchi, Toyota (JP); Masaru Kondo, Toyota (JP); Takashi Tomikawa, Toyota (JP); Katsuhiro Ashihara, Toyota (JP); Masao Takahashi, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 711 days.

(21) Appl. No.: 12/736,152

(22) PCT Filed: Apr. 17, 2009

(86) PCT No.: PCT/JP2009/057780
§ 371 (c)(1),
(2), (4) Date: Sep. 14, 2010

(87) PCT Pub. No.: WO2009/128538
PCT Pub. Date: Oct. 22, 2009

(65) Prior Publication Data
US 2011/0002563 A1    Jan. 6, 2011

(30) Foreign Application Priority Data

Apr. 18, 2008  (JP) .................................. 2008-108990

(51) Int. Cl.
*F16C 33/10* (2006.01)
*F16C 9/02* (2006.01)

(52) U.S. Cl.
USPC ............................ 384/288; 384/291; 384/294

(58) Field of Classification Search
USPC .......... 384/288, 276, 286, 291, 294, 292, 429
See application file for complete search history.

(56) References Cited

U.S. PATENT DOCUMENTS 2,131,170 A * 9/1938 Evans ........................... 384/291
3,801,173 A * 4/1974 McKindree ................... 384/288

FOREIGN PATENT DOCUMENTS

| GB | 2230826 A | * 10/1990 | .............. F16C 33/10 |
| JP | 02-102014 | 8/1990 | |
| JP | 03048017 A | * 3/1991 | .............. F16C 33/10 |
| JP | 03-177612 | 8/1991 | |
| JP | 03-255222 | 11/1991 | |
| JP | 04-027219 | 3/1992 | |
| JP | 05-202936 | 8/1993 | |
| JP | 07-139539 | 5/1995 | |
| JP | 09-112535 | 5/1997 | |

(Continued)

OTHER PUBLICATIONS

Machine Translation for JP 2009-174697.*

(Continued)

*Primary Examiner* — Thomas R Hannon
*Assistant Examiner* — Yamilka Pinero Medina
(74) *Attorney, Agent, or Firm* — Flynn, Thiel, Boutell & Tanis, P.C.

(57) ABSTRACT

A sliding bearing 5 is composed of a pair of halved bearings 11, 12 and is provided with crush reliefs 11E, 12E in positions adjoining abutment surfaces 11B, 12B of these halved bearings. Chamfered portions 11D, 12D are formed in inward edge portions of the above-described abutment surfaces 11B, 12B, and a dust pocket 15 is formed on the middle side of the chamfered portions 11D, 12D. The relative angle α formed by the above-described crush reliefs 11E, 12E with sliding surfaces 13 in positions adjoining the crush reliefs 11E, 12E is set at 0.69° or more.

3 Claims, 11 Drawing Sheets

(56) References Cited

FOREIGN PATENT DOCUMENTS

| JP | 10-030419 | | 2/1998 | | |
|----|-----------|---|--------|---|---|
| JP | 2002-188636 | | 7/2002 | | |
| JP | 2004-510929 | | 4/2004 | | |
| JP | 2005-069284 | | 3/2005 | | |
| JP | 2009-174697 | * | 3/2008 | ................ | F16C 9/04 |

| JP | 2008-082355 | 4/2008 |
|----|-------------|--------|

OTHER PUBLICATIONS

Machine Translation for JP 2008-0802355.*
Machine Translation for JP 7-139539.*
Machine translation of abstract of JP 03-848017.*

* cited by examiner

FIG. 6 PRIOR ART
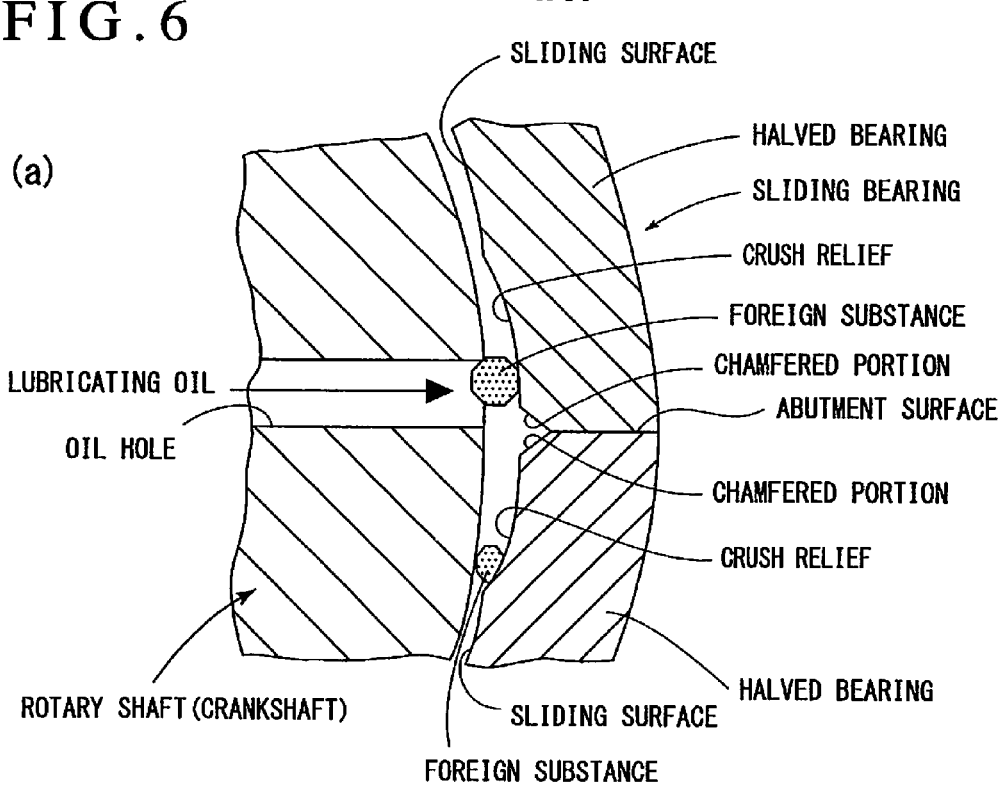
(a)
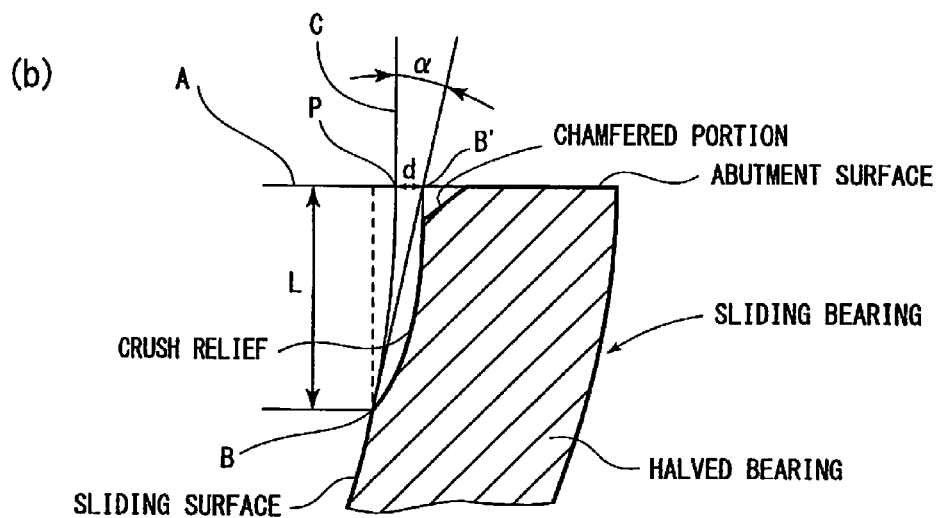
(b)

FIG.7

| Shaft diameter [mm] | | Crush relief depth d[mm] | | | Crush relief length L[mm] | | | Angle α [deg] | |
|---|---|---|---|---|---|---|---|---|---|
| | | Drawing value | min | max | Drawing value | min | max | min | max |
| φ40~90 | Conventional product | 0.02~0.05 | 0.02 | 0.05 | 6.5±1.5 | 5 | 8 | 0.14 | 0.57 |
| | Invention | 0.06~0.09 | 0.06 | 0.09 | 3.5±1.5 | 2 | 5 | 0.69 | 2.58 |
| φ90~125 | Conventional product | 0.02~0.05 | 0.02 | 0.05 | 9.5±2.0 | 7.5 | 11.5 | 0.10 | 0.38 |
| | Invention | 0.09~0.13 | 0.09 | 0.13 | 5.5±2.0 | 3.5 | 7.5 | 0.69 | 2.13 |

FIG.8

- Engine type: V6 3.5L
- Test name: Motoring test
- Rotation number x load: 500 to 4000 rpm x no load
- Test time: Approx. 6 min
- Oil type: 0W-20    Oil temp.: On a go-it-alone basis
- Water temp.: On a go-it-alone basis
- Twelve pieces of metallic foreign substances 0.5 mm in diameter were put in and the number of flaws occurring on the bearing surface was counted.
- The number of flaws as a total was counted in bearings for three cylinders of one bank (a total of 6 halved bearings). (Two types of specifications were incorporated in one test unit.)

FIG. 9
(a) Effect of crush relief angle α
(Dimensional unit: mm)
| Specification for bearings | ① | ⑨ | ③ | ⑥ | ⑩ | ⑪ | ⑫ |
|---|---|---|---|---|---|---|---|
| Crush relief length L | 6.5 | 2.5 | 3.5 | 6.5 | 2.5 | 3.5 | 6.5 |
| Crush relief depth d | 0.035 | 0.080 | 0.080 | 0.080 | 0.080 | 0.080 | 0.080 |
| Crush relief angle α | 0.309 | 1.833 | 1.309 | 0.705 | 1.833 | 1.309 | 0.705 |
| Chamfer | 0.25 | 0.45 | 0.45 | 0.45 | 0.45 | 0.45 | 0.45 |
| Dust pocket length | 0 | 0 | 0 | 0 | 1 | 1 | 1 |
| Dust pocket width | | | | | 4 | 4 | 4 |
| Number of flaws (total) | 29 | 6 | 4 | 24 | 12 | 6 | 13 |
| Number of flaws (depth < 10 μm) | 4 | 6 | 1 | 14 | 12 | 6 | 13 |
| Number of flaws (depth 10 to 40 μm) | 21 | 0 | 3 | 9 | 0 | 0 | 0 |
| Number of flaws (depth > 40 μm) | 4 | 0 | 0 | 1 | 0 | 0 | 0 |
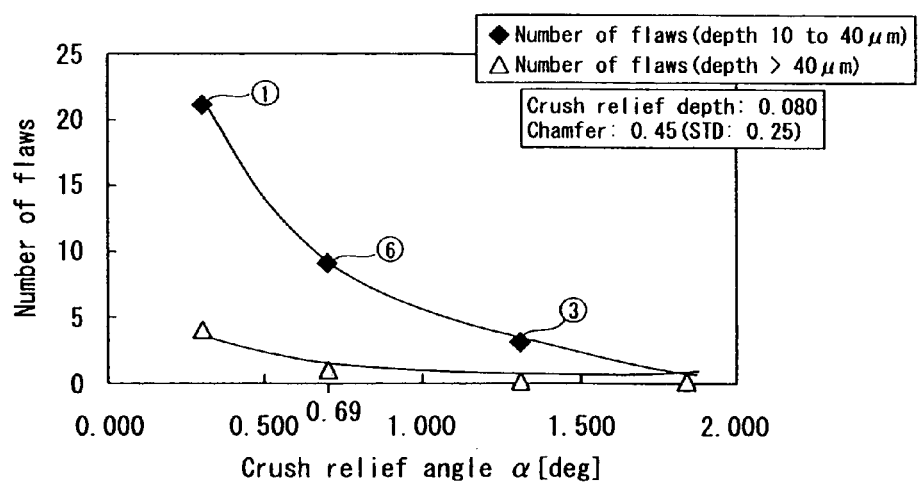
(b)
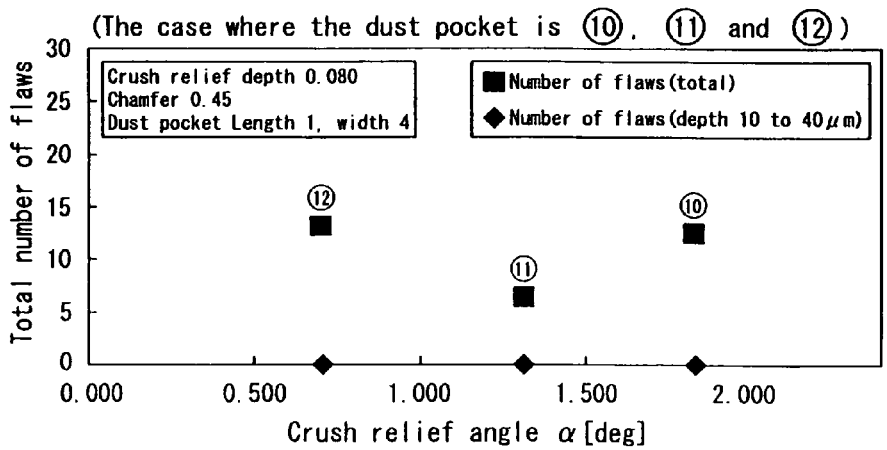
(c)

(a)

| Specification for bearings | ④n=1 | ④n=2 | ⑤ |
|---|---|---|---|
| Crush relief length L | 3.5 | 3.5 | 3.5 |
| Crush relief depth d | 0.080 | 0.080 | 0.020 |
| Crush relief angle α | 1.309 | 1.309 | 0.327 |
| Chamfer | 0.45 | 0.45 | 0.45 |
| Dust pocket length | 2 | 2 | 2 |
| Dust pocket width | 4 | 4 | 4 |
| Number of flaws (total) | 3 | 4 | 16 |
| Number of flaws (depth < 10 μm) | 3 | 3 | 10 |
| Number of flaws (depth 10 to 40 μm) | 0 | 1 | 6 |
| Number of flaws (depth > 40 μm) | 0 | 0 | 0 |

(Dimensional unit : mm)

| Specification | | Conventional pro | Invention(1) | Invention(2) |
|---|---|---|---|---|
| Specification for bearings | Crush relief length L | 5.0 | 3.5 | 2.5 |
| | Crush relief depth d | 0.035 | 0.075 | 0.070 |
| | Crush relief angle $\alpha$ | 0.401 | 1.228 | 1.604 |
| | Chamfer of abutment surface | 0.25 | 0.45 | 0.35 |
| | Dust pocket length | No dust pocket | No dust pocket | No dust pocket |
| | Dust pocket width | | | |
| Test results | Number of flaws(total) | 82 | 11 | 12 |
| | Number of flaws(depth < 10$\mu$m) | 34 | 10 | 8 |
| | Number of flaws(depth $\geq$ 10$\mu$m) | 48 | 1 | 4 |

(Dimensional unit : mm)

(b) 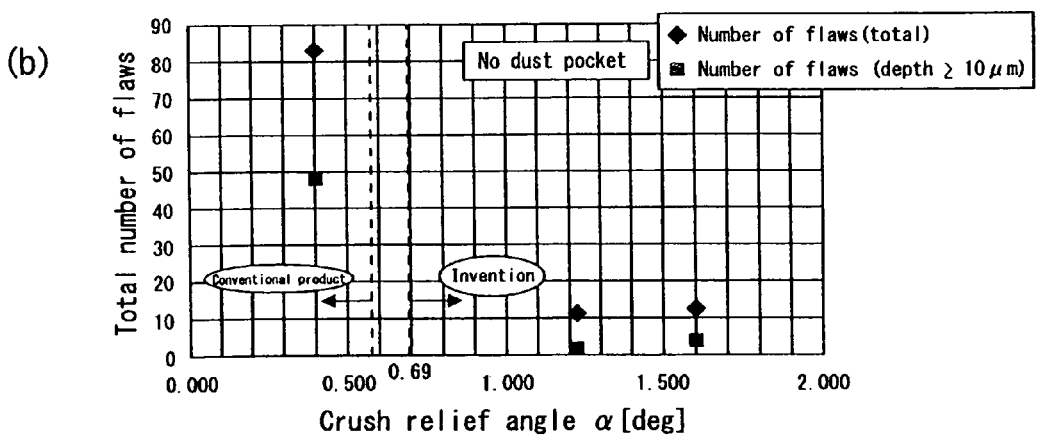

(c)
- Engine type: L4 2.8L
- Test name: Motoring test
- Rotation number x load: 200 to 4000 rpm x no load
- Test time: Approx. 9 min
- Oil type: 0W-20
- Water temp.: On a go-it-alone basis
- Eight pieces of metallic foreign substances 0.5 mm in diameter were put in and the number of flaws occurring on the bearing surface was counted.
- The number of flaws as a total was counted in bearings for four cylinders(a total of 8 halved bearings)

FIG. 13
(a) 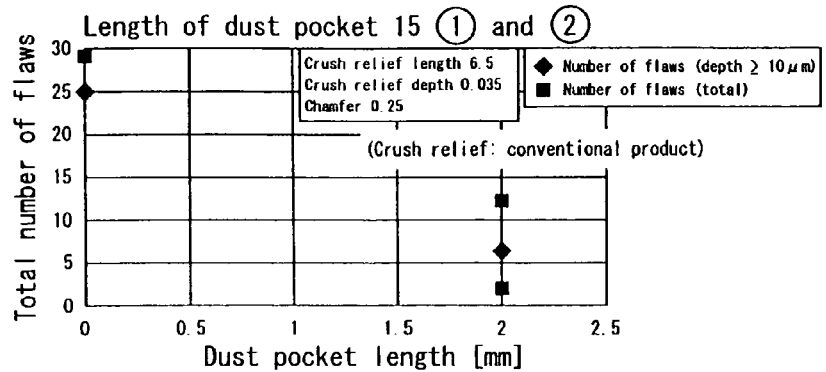
(b) 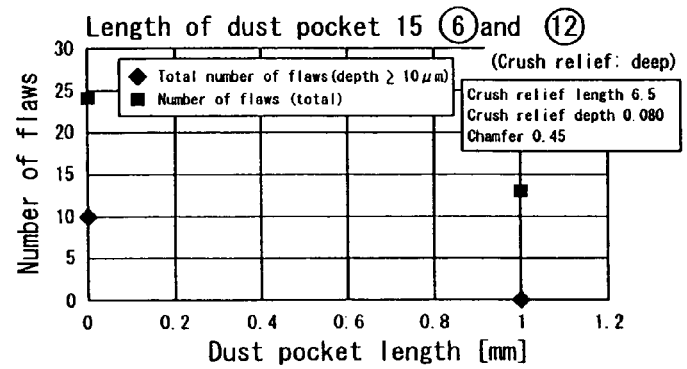
(c) 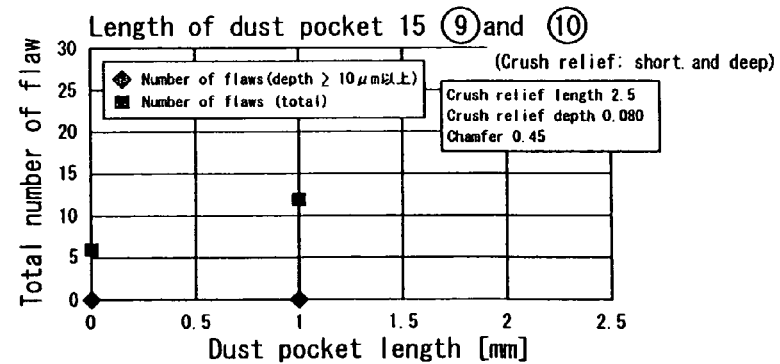
(d) 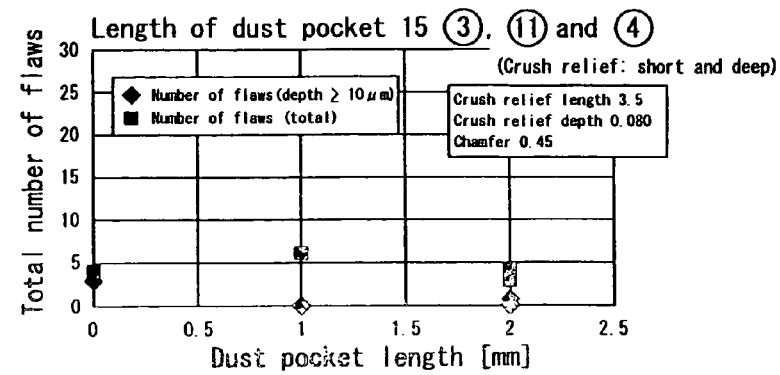

SLIDING BEARING

TECHNICAL FIELD

The present invention relates to a sliding bearing and, more particularly, to a sliding bearing which is formed in the shape of a cylinder by causing a pair of halved bearings to abut against each other.

BACKGROUND ART

There have hitherto been known sliding bearings which are formed in the shape of a cylinder by causing a pair of halved bearings to abut against each other and in which crush reliefs are provided on inner circumferential surfaces providing positions adjoining the abutment surfaces of the above-described halved bearings (refer to Patent Documents 1 to 3, for example).

In such conventional sliding bearings, it is ensured that in causing a pair of halved bearings to abut against each other to make cylindrical shape as a whole, the deformation of areas in the vicinity of the abutment surfaces is allowed by the presence of the above-described crush reliefs in the positions adjoining the abutment surfaces.

PRIOR ART DOCUMENT LIST

Patent Documents

Patent Document 1: Japanese Utility Model Laid-Open No. 2-102014
Patent Document 2: Japanese Patent Laid-Open No. 3-255222
Patent Document 3: Japanese Patent Laid-Open No. 2002-188636

DISCLOSURE OF THE INVENTION

Problems to be Solved by the Invention

In conventional general sliding bearings, the relative angle α formed by the above-described crush relief with the sliding surface adjoining the crush relief has been relatively small. That is, as shown in FIG. 6(b), when the length of the crush relief is set at 6.5 mm and the depth d thereof on the free end side (the maximum depth) is set at 0.035 mm, the relative angle α formed by the crush relief and the sliding surface in a position adjoining the crush relief becomes 0.309°. The length L and depth d of the crush relief are defined as follows. That is, an imaginary straight line A which is extended from the abutment surface to the inward side is assumed, and the distance of a perpendicular line made from an end portion B of the inward side of the crush relief onto the above-described imaginary line A is defined as the length L of the crush relief. Furthermore, when a curved line of the sliding surface is extended from the end portion B on the inward side of the crush relief and an imaginary circular arc line C which intersects with the above-described imaginary line A is assumed, the linear distance from the intersecting point P of the two imaginary lines A and C to a free end B' of the crush relief before the formation of a chamfered portion is defined as the depth d of the crush relief.

According to the tests and studies conducted by the inventors of this application, they reached the conclusion that conventional sliding bearings are poor in seizure resistance from the cause described below. That is, as shown in FIG. 6(a), in a sliding bearing of this kind, the lubricating oil flowing out of an oil hole of a rotary shaft (crankshaft) passes through the crush relief and the interior of the chamfered portion and is discharged to the outside from openings of both side portions. On that occasion, relatively small foreign substances mixing into the lubricating oil are discharged along with the lubricating oil to the outside of the sliding bearing, but, in particular, large foreign substances larger than the clearance between the rotary shaft and the sliding bearing (for example, foreign substances of 0.2 mm or more in diameter) enter the area between the sliding surface of the sliding bearing and the rotary shaft. Then, as shown in FIG. 6(a), large foreign substances present in the lubrication path are not completely discharged from the oil hole of the rotary shaft and they flow around within the sliding bearing in a condition in which they are caught in the oil hole. Due to this flowing-around of the foreign substances, linear flaws are formed on the sliding surface of the sliding bearing, sometimes several-fold, and the linear flaws break a lubricating oil film, bringing about solid contact of the rotary shaft with the sliding bearing and leading to seizure. Conventional sliding bearings have the disadvantage described above.

Means for Solving the Problems

In view of the circumstances described above, in the first aspect of the present invention, in a sliding bearing which is formed in the shape of a cylinder as a whole by causing abutment surfaces of a pair of halved bearings to abut against each other and in which inner circumferential surfaces of the halved bearings are formed as sliding surfaces, crush reliefs are formed on the inner circumferential surfaces of the halved bearings which provide positions adjoining the abutment surfaces, and chamfered portions are formed at inner circumferential edges of the abutment surfaces which provide boundaries with the crush reliefs, the depth and length of the crush reliefs are set so that a relative angle formed by the crush reliefs and the sliding surfaces which provide positions adjoining the crush relief becomes 0.69° or more and the chamfer size of the chamfered portions is set at 0.1 to 0.6 mm.

In the second aspect of the present invention, in a sliding bearing which is formed in the shape of a cylinder as a whole by causing abutment surfaces of a pair of halved bearings to abut against each other and in which inner circumferential surfaces of the halved bearings are formed as sliding surfaces, crush reliefs are formed on inner circumferential surfaces of the halved bearings which provide positions adjoining the abutment surfaces, and a dust pocket is formed from the crush reliefs to the abutment surfaces, the depth and length of the crush reliefs are set so that a relative angle formed by the crush reliefs and sliding surfaces which provide positions adjoining the crush reliefs becomes 0.69° or more.

Advantage of the Invention

According to this configuration, as will be understood from test results described below, it is possible to provide a sliding bearing excellent in seizure resistance compared to conventional sliding bearings.

BRIEF DESCRIPTION OF THE DRAWINGS

FIGS. 6(a) and 6(b) are sectional views showing conventional art;

FIG. 7 is a diagram showing the specifications for each sliding bearing on which the test was conducted;

FIG. 8 is a diagram showing the test conditions of the sliding bearings of FIG. 7;

FIGS. 9(a) to 9(c) are diagrams showing the test results of the foreign substance discharging ability of sliding bearings which depend on the length of a crush relief;

FIGS. 11(a) to 11(c) are diagrams showing the test results of the foreign substance discharging ability of sliding bearings which depend on the size of a crush relief;

FIGS. 13(a) to 13(d) are diagrams showing the test results of the foreign substance discharging ability of sliding bearings which depend on the length of a dust pocket 15.

DESCRIPTION OF EMBODIMENTS

Figure 1:
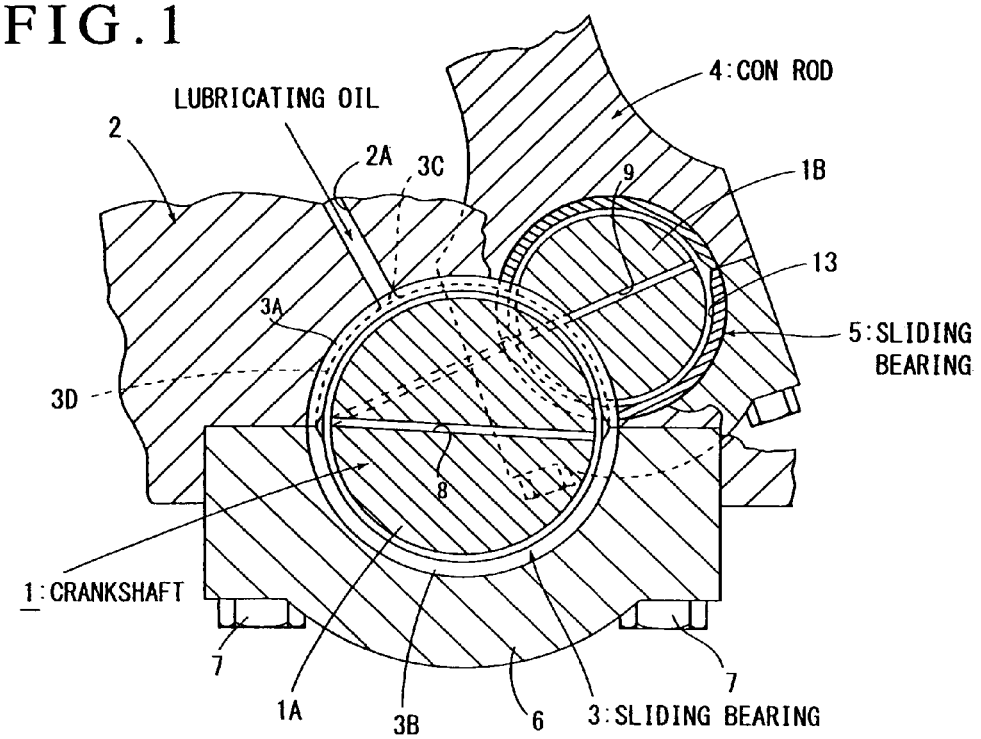
FIG. 1 is a sectional view of a main part of an engine showing an embodiment of the present invention.

An embodiment of the present invention will be described below. FIG. 1 shows a sectional view of a crankshaft 1 of an automotive engine and areas surrounding the crankshaft 1. The automotive engine of this embodiment is provided with a cylinder block 2, the above-described crankshaft 1 having a journal portion 1A and a crank pin 1B, a sliding bearing 3 as a main bearing which rotatably supports a shaft of the journal portion 1A of this crankshaft 1, and a sliding bearing 5 as a con-rod bearing which is provided on a con rod 4 and rotatably supports a shaft of the above-described crank pin 1B.

The sliding bearing 3 is formed in the shape of a cylinder by causing a pair of upper and lower halved bearings 3A and 3B to abut against each other, and this sliding bearing 3 is mounted to the cylinder block 2 by use of a bearing cap 6 and a plurality of bolts 7.

A vertical lubricating oil passage 2A is formed in an essential position of the above-described cylinder block 2. A radial hole 3C is formed in the upper-side halved bearing 3A of the sliding bearing 3 so as to match the position of a lower-end portion of the lubricating oil passage 2A, and an oil groove 3D is formed on an inner circumferential surface (a sliding surface) of the halved bearing 3A so as to be continuous from the radial hole 3C.

A first lubricating oil passage 8 formed from a radial through hole is formed in the journal portion 1A of the crankshaft 1. A second lubricating oil passage 9 in a slant direction is formed from an outer circumferential surface of the journal portion 1A in the vicinity of one end of the first lubricating oil passage 8 to a position of an outer circumferential surface of the crank pin 1B.

With the above-described configuration, when a lubricating oil is discharged from an oil pump which is not shown, the lubricating oil passes through the lubricating oil passage 2A of the cylinder block 2 and then is introduced into the first lubricating oil passage 8 of the journal portion 1A via the radial hole 3C of the halved bearing 3C and the oil groove 3D. It is ensured thereby that the lubrication of the sliding surface of the sliding bearing 3, which is the main bearing, is performed. Part of the lubricating oil is supplied to between a sliding surface 13 of the sliding bearing 5 and the crank pin 1B via the second lubricating oil passage 9 to perform the lubrication of the sliding portions of the two members.

Figure 2:
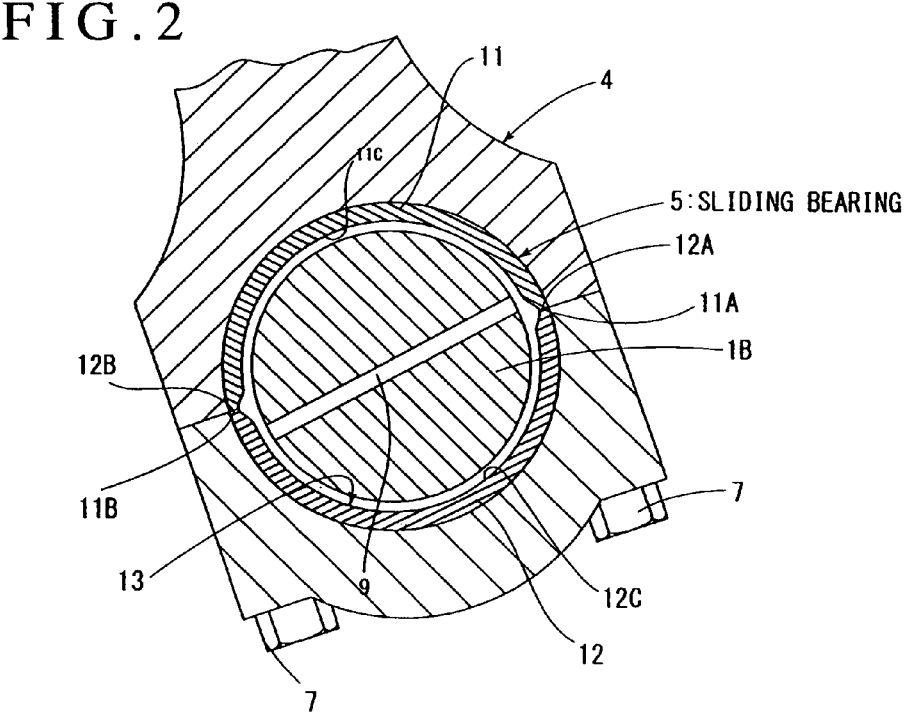
FIG. 2 is an enlarged view of a main part of FIG. 1.
Figure 3:
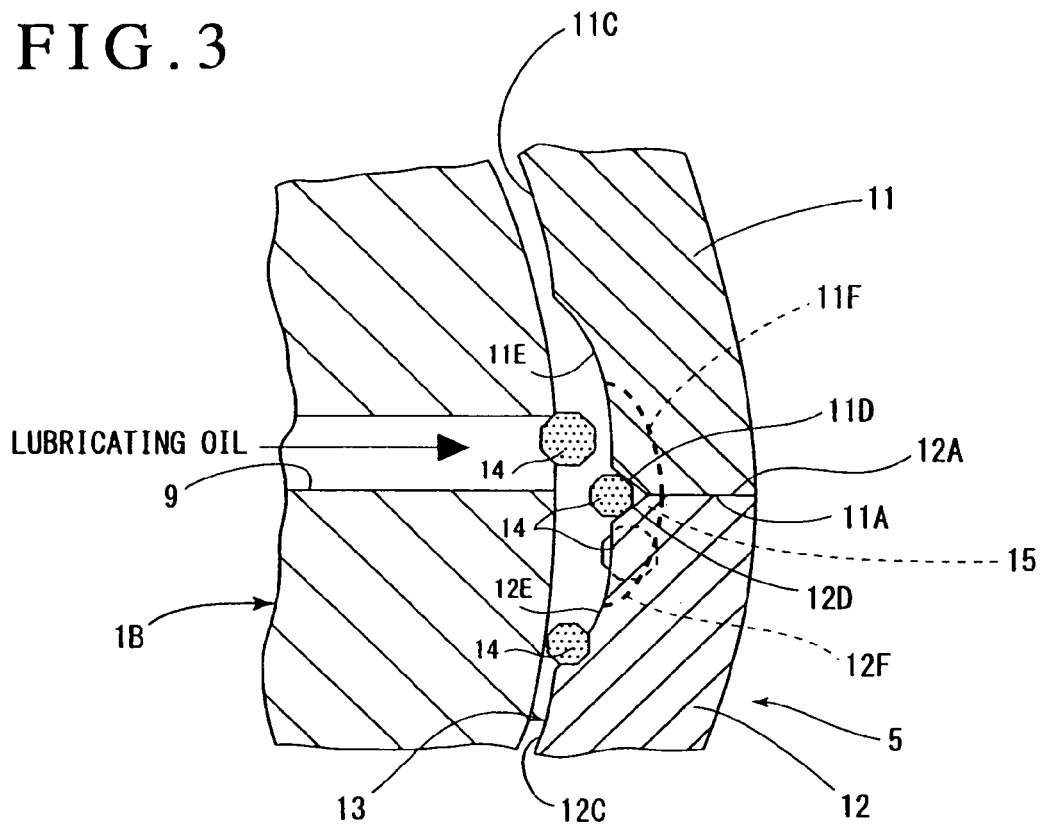
FIG. 3 is an enlarged view of a main part of FIG. 2.

As shown in an enlarged manner in FIGS. 2 and 3, the sliding bearing 5 as the con-rod bearing is composed of an upper-side halved bearing 11 in semicircular shape and a lower-side halved bearing 12 in semicircular shape, and the sliding bearing 5 is formed in the shape of a cylinder as a whole by causing abutment surfaces 11A, 12A, 11B, 12B in opposite positions of the pair of halved bearings 11, 12 to abut against each other. Inner circumferential surfaces 11C, 12C of the halved bearings 11, 12 constitute the cylindrical sliding surface 13, and the outer circumferential surface of the crank pin 1B is rotatably supported by this sliding surface 13.

Figure 4:
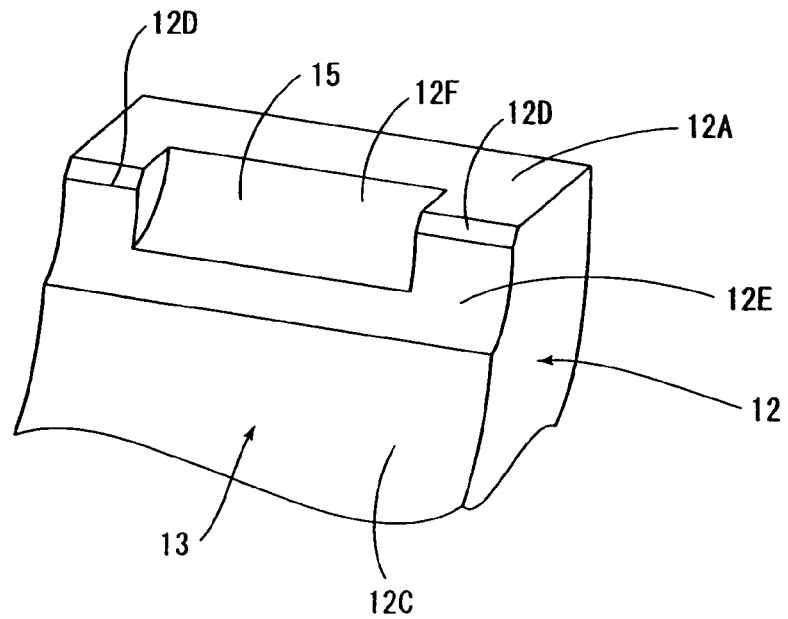
FIG. 4 is a perspective view of the main part shown in FIG. 3.

As shown in an enlarged manner in FIGS. 3 and 4, in inward-side edge portions of the abutment surfaces 11A, 11B, 12A, 12B of the two halved bearings 11, 12, chamfered portions 11D, 12D are formed at an angle of 45 degrees to the circumferential direction, and crush reliefs 11E, 12E are formed on the inner circumferential surfaces 11C, 12c which provide positions adjoining the chamfered portions 11D, 12D.

In the sliding bearing 5 of this embodiment, in the axial middle side of the chamfered portions 11D, 12D, notched portions 11F, 12F are formed from the abutment surfaces 11A, 11B, 12A, 12B to the crush reliefs 11E, 12E, and the inner space of these upper and lower notched portions 11F, 12F constitutes dust pocket 15 capable of housing foreign substances 14.

As described above, in the engine of this embodiment, when a lubricating oil is discharged from the pump, the lubricating oil is supplied to between the journal portion 1A of the crankshaft 1 and the sliding bearing 3 and at the same time the lubricating oil is supplied also to between the outer circumferential surface of the crank pin 1B and the sliding surface 13 of the sliding bearing 5 via the second lubricating oil passage 9 of the crank pin 1B, whereby an oil film is formed on the sliding surface 13. Part of the lubricating oil is discharged to the outside from openings which provide both axial sides via the interior of the crush reliefs 11E, 12E and the area between the crank pin 1B and the sliding surface 13. On that occasion, among the micro foreign substances 14 which get mixed into the lubricating oil, foreign substances 14 smaller than the depth of the crush reliefs 11E, 12E pass through the crush reliefs 11E, 12E and are discharged to the outside from openings at both axial ends thereof.

In this embodiment, on the premise of the sliding bearing 5 configured as described above, the size of the above-described crush reliefs 11E, 12E, the size of the chamfered portions 11D, 12D and the like are set as follows by assuming the case where large foreign substances 14 on the order of 0.5 mm get mixed into the lubricating oil.

Figure 5:
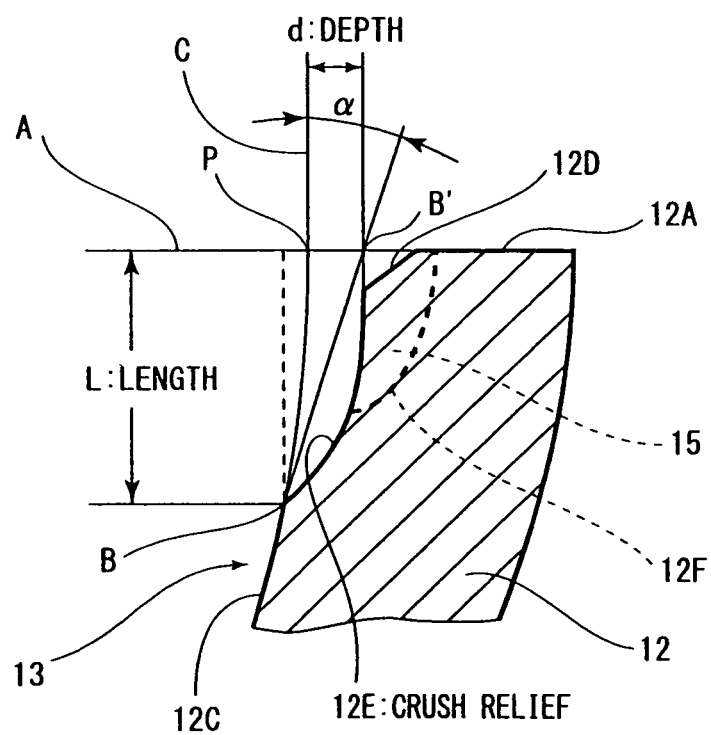
FIG. 5 is a front view showing the main part of FIG. 3.

That is, as shown in FIG. 5, the length L of the crush relief 12E is set at 3.5 mm and the depth d of the crush relief 12E is set at 0.08 mm. In this embodiment, the length L and depth d of the crush relief 12E are defined as follows. That is, an imaginary straight line A which is extended from the abutment surface 12A to the inward side is assumed, and the distance of a perpendicular line made from an end portion B of the inward side of the crush relief 12E onto the above-described imaginary line A is defined as the length L of the crush relief 12E. Furthermore, when a curved line of the sliding surface 12C is extended from the end portion B on the inward side of the crush relief 12E and an imaginary circular arc line C which intersects with the above-described imaginary line A is assumed, the linear distance from the intersecting point P of the two imaginary lines A and C to a free end B' of the crush relief 12E before the formation of the chamfered portion 12D is defined as the depth d of the crush relief 12E.

Because the length L and depth d of the crush relief 12E are set at the above-described dimensions, in this embodiment the relative angle α formed by the crush relief 12E with the sliding surface 12C which provides a position adjoining the crush relief 12E becomes 1.309°. The shaft diameter of the sliding bearing 5 is sufficiently large for the length L and depth d of the crush relief 12E. Therefore, this angle α can be expressed as tan α=d/L, when the imaginary circular arc line C is approximated as a straight line.

As is apparent from the test results which will be described later, by setting the length and depth of the crush relief 12E so that this angle α becomes 0.69° or more, it is possible to improve the seizure resistance of the sliding bearing 5 compared to conventional art.

As described above on the basis of FIG. 6(b), in conventional general sliding bearings, the relative angle α formed by a crush relief with a sliding surface is on the order of 0.309°, for example, whereas the above-described angle α of the sliding bearing 5 of this embodiment is set at not less than values approximately twice as large as conventional values.

In this embodiment, the chamfer size of the chamfered portion 12D is set at 0.45 mm or 30°×0.45 mm. The size of the chamfered portion 12D, which can be set according to the size of foreign substances which are allowed, may be 0.10 to 0.60 mm at a chamfer sectional angle of 45° and more preferably in the range of 0.20 to 0.60 mm.

It is preferred that the axial dimension of the notched portion 12F be limited to a size equivalent to the inside diameter of the second lubricating oil passage 9 of the crank pin 1B or a size approximately 30 to 70% of the axial dimension (width) of the halved bearing 12. If the axial dimension of the notched portion 12F is set at larger values, the lubricating oil leaks too much from the openings at both axial ends of the crush relief 12E, with the result that it becomes necessary to review the lubricating oil pump capacity due to an abnormal drop of the hydraulic pressure and an increase in the required oil volume.

It is fundamental to set the depth of the notched portion 12F at values equal to or larger than the maximum size of the foreign substances 14 supposed to get mixed into the lubricating oil, and it is preferred that the depth of the notched portion 12F be on the order of five times the depth of the above-described crush relief 12E or a value equivalent to the chamfer size of the chamfered portion 12D or be set at values 0.2 mm or so deeper than the chamfer size. This is because depths not less than the size of foreign substances 14 are required to positively discharge the foreign substances 14 entering the interior of the sliding bearing 5 from the second lubricating oil passage 9 of the crank pin 1B and to capture the foreign substances 14. In this embodiment, the tests were conducted by supposing foreign substances 14 on the order of 0.5 mm in diameter.

In the above-described size setting, on the basis of FIG. 5, the description was given of the details of the sizes of the crush relief 12E which is one of the two crush reliefs, the chamfered portion 12D and the notched portion 12F in the halved bearing 12 on the lower side. Also the sizes of the crush relief 11E which is the other of the two crush reliefs, the chamfered portion 11D and the notched portion 11F in the halved bearing 12 on the upper side are set at the same sizes as the crush relief 12E, chamfered portion 12D and notched portion 12F which are shown in FIG. 5.

According to the sliding bearing 5 of this embodiment thus configured, as shown in FIG. 3, when foreign substances 14 getting mixed into the lubricating oil have reached the interior of the crush reliefs 11E, 12E, relatively small ones among these foreign substances 14 are discharged from the openings of the side portions of the crush reliefs 11E, 12E, and relatively large ones are housed in the space formed by the chamfered portions 11D, 12D and in the dust pocket 15.

In this embodiment, the angle α formed by the crush reliefs 11E, 12E with the sliding surface 13 which provides positions adjoining the crush reliefs 11E, 12E is increased to values approximately twice as large as conventional values. Therefore, even if foreign substances 14 remain in the interior of the crush reliefs 11E, 12E, the foreign substances 14 are less apt to enter the area between the sliding surface 13 and the outer circumferential surface, of the crank pin 1B. Part of the foreign substances 14 are driven into a relatively soft bearing alloy within the crush reliefs 11E, 12E and are housed in a buried manner. For this reason, in the sliding bearing 5 of this embodiment, linear flaws, which are caused by foreign substances 14 on the sliding surface 13 of the sliding bearing 5, are less apt to occur and, therefore, it is possible to provide a sliding bearing 5 excellent in seizure resistance.

The volumes of a lubricating oil flowing out of the crush reliefs of the sliding bearing of the present invention and crush reliefs of conventional sliding bearings are almost the same and, therefore, it is possible to minimize a drop in the lubricating oil fueling pressure in an engine dedicated to automobiles.

Next, a description will be given of the test results which provide the grounds for setting the above-described sizes of the crush reliefs 11E, 12E and the like of the sliding bearing 5 in this embodiment.

FIG. 7 shows the size of each sliding bearing 5 in which the above-described relative angle α was varied by changing the length L and depth d of the crush reliefs 11E, 12E for a motoring test, and FIG. 8 shows test conditions under which the motoring test was conducted on each of the sliding bearings 5 shown in FIG. 7.

As shown in FIG. 8, in this motoring test, 12 pieces of foreign substances 0.5 mm in diameter were put in and the number of linear flaws occurring on the sliding surface 13 of the sliding bearing 4 was investigated. The number of flaws as a total was counted in sliding bearings for three cylinders of one bank (i.e., a total of 6 halved bearings) as the number of flaws.

FIGS. 9(a) to 9(c) show the test results of a motoring test on the sliding bearing 5 in which the relative angle α was varied by changing the length L of the crush reliefs 11E, 12E, with the depth d of the crush reliefs 11E, 12E kept constant.

The specification 1 for bearings in FIG. 9(a) applies to a conventional sliding bearing, the specifications for bearings [9], [3] and [6] apply to those which are not provided with the above-described dust pocket 15, and the specifications for bearings [10], [11], and [12] apply to those which are provided with the above-described dust pocket 15.

It can be understood that what can be said from the test results of FIGS. 9(a) to 9(c) is that the number of flaws is small in the sliding bearings in which the above-described relative angle α related to the crush reliefs 11E, 12E is large and that, in further detail, as is apparent from FIG. 9(b), the foreign substance discharging ability from the sliding bearing 5 is good when the angle α is 0.69° or more.

Furthermore, from the test results of FIG. 9(c) it can be understood that flaws of 40 μm or more in depth did not occur in the least when the dust pocket 15 was provided.

Next, FIGS. 10(a) and 10(b) show the results of a motoring test conducted by use of an engine different from the above-described engine. That is, the figures show the results of a motoring test conducted on the sliding bearing 5 in which the relative angle α was varied by changing the depth d of the crush reliefs 11E, 12E, with the length L of the crush reliefs 11E, 12E kept constant.

Figure 10:
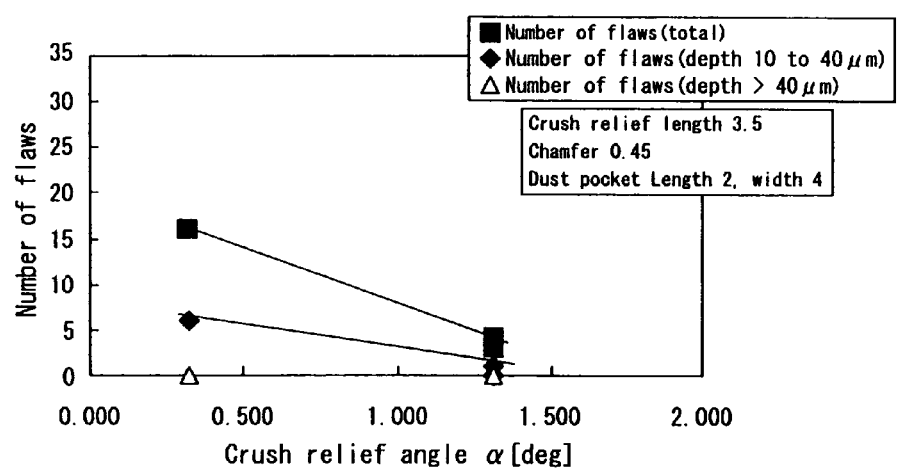
FIGS. 10(a) and 10(b) are diagrams showing the test results of the foreign substance discharging ability of sliding bearings which depend on the depth of a crush relief.

The specifications for bearings [4] n=1 and [4] n=2 in FIG. 10(*a*) each apply to the sliding bearings of this embodiment, and the specification for bearings [5] applies to a conventional sliding bearing. The above-described dust pocket is formed in all of these bearings.

It can be understood that what can be said from the test results of FIGS. 10(*a*) and 10(*b*) is that the number of flaws is small in the sliding bearings in which the above-described relative angle α related to the crush reliefs 11E, 12E is large and that, in further detail, as is apparent from FIG. 10(*b*), the foreign substance discharging ability from the sliding bearing 5 is good when the relative angle α is 0.69° or more.

Based upon the test results in FIGS. 10(*a*) and 10(*b*) above, the length L and depth d of the crush reliefs 11E, 12E of the sliding bearing 5 of this embodiment are set so that the relative angle α of the crush reliefs 11E, 12E in the sliding bearing 5 of this embodiment becomes 1.309° as described above.

Next, FIGS. 11(*a*) to 11(*c*) show a test of the foreign substance discharging ability of sliding bearings by another motoring test. FIGS. 11(*a*) and 11(*b*) show the specifications for the sliding bearings on which the test was conducted and the test results. FIG. 11(*c*) shows the test conditions of the motoring test. Also in this test, as with the case of the test of FIG. 8 above, eight pieces of metallic foreign substance 0.5 mm in diameter were put in and the number of flaws occurring on the sliding surface of the sliding bearing 5. The number of flaws as a total was counted in sliding bearings for 4 cylinders (i.e., a total of 8 halved bearings) as the number of flaws.

As is apparent from the test results shown in FIG. 11(*a*), the number of flaws of less than 10 μm in the inventions (1) and (2) was not more than ⅓ of that of conventional products. As is apparent from the test results of FIG. 11(*b*), it can be understood that the number of flaws is substantially reduced by setting the above-described relative angle α of the crush reliefs 11E, 12E at 0.69° or more.

In view of the test results, as described above, it is preferred that the above-described relative angle α related to the crush reliefs 11E, 12E be 1° or more in terms of the foreign substance discharging ability.

Figure 12:
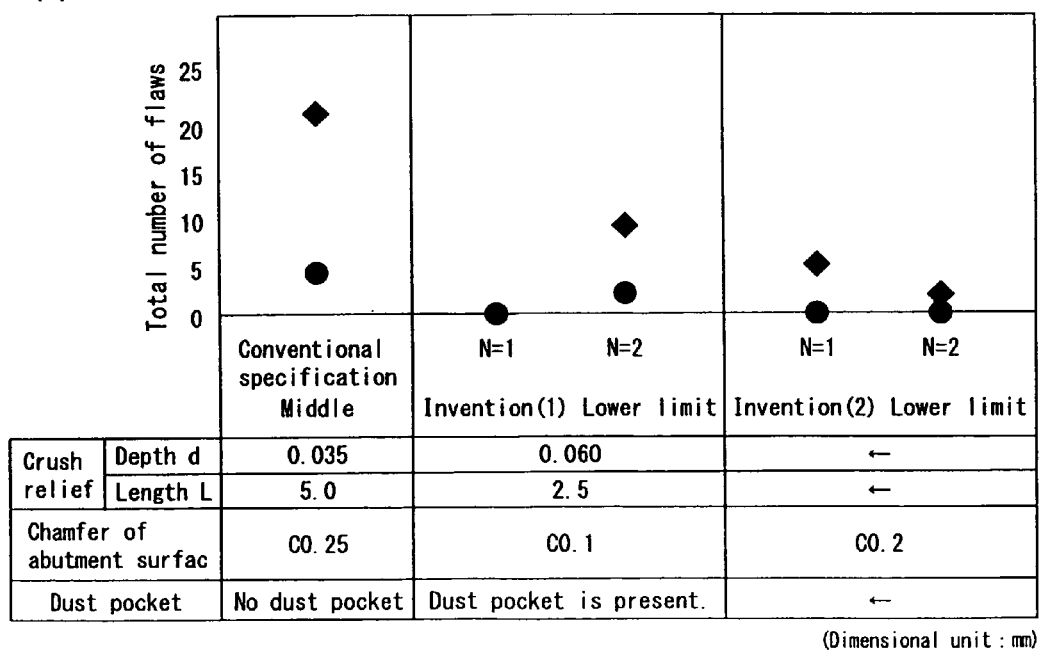
FIGS. 12(a) and 12(b) are diagrams showing the test results of the foreign substance discharging ability of sliding bearings which depend on the size of chamfered portions 11D and 12D.

Next, FIGS. 12(*a*) and 12(*b*) show the results of a test related to the size of the chamfered portions 11D, 12D in positions opposite to the crush reliefs 11E, 12E, whose dimensions are constant, and the foreign substance discharging ability. The test conditions are the same as those shown in FIG. 11(*c*).

The sliding bearings on which the test was conducted are a conventional product and the inventions (1) and (2). It is apparent that what can be said from the test results shown in FIG. 12(*b*) is that the number of flaws is smaller in the inventions (1) and (2) provided with the dust pocket 15 than in the conventional product. That is, the inventions (1) and (2) are better in foreign substance discharging ability than the conventional product. A comparison between the invention (1) and the invention (2) reveals that flaws of 40 μm or more having a crucial effect on the seizure of the sliding bearing do not occur in the least when the size of the chamfered portions 11D, 12D is large and that also the number of minute flaws of 40 μm or less is small, and hence it can be understood that the foreign substance discharging ability is good.

On the basis of the test results, in the sliding bearing 5 of this embodiment, the size of the 11D, 12D is set at 0.1 to 0.6 mm as described above, but it is more preferably set at 0.2 to 0.6 mm.

Next, FIGS. 13(*a*) to 13(*d*) show the test results of the foreign substance discharging ability of the sliding bearing 5 observed when the size of the dust pocket 15 was changed for prescribed sizes of the crush reliefs 11E, 12E.

What can be roughly said from the test results of FIGS. 13(*a*) to 13(*d*) is that in the size setting of the conventional crush relief, the larger the length of the dust pocket, the smaller the number of flaws, but no significant difference was observed in the effect of the length of the dust pocket 15 when the crush reliefs 11E, 12E were deep and the chamfer size of the inner circumferential portions of the abutment surfaces, 11A, 11B, 12A, 12B was large. It seems that the effect did not exhibit itself because the size of the foreign substances (0.5 mm in diameter) and the gap of the chamfered portions 11D, 12D which provide the inward side of the abutment surfaces 11A, 11B, 12A and 12B are on the same order, and hence it can be inferred that the effect of the dust pocket 15 exhibits itself when the size of foreign substances is much larger.

In particular, with reference to FIG. 13(*c*), when the length L of the crush reliefs 11E, 12E is short and the depth d is deep, it might be thought that the existence or nonexistence of the dust pocket 15 has no correlation to the number of flaws occurring on the sliding surface 13 of the sliding bearing 5.

Figure 14:
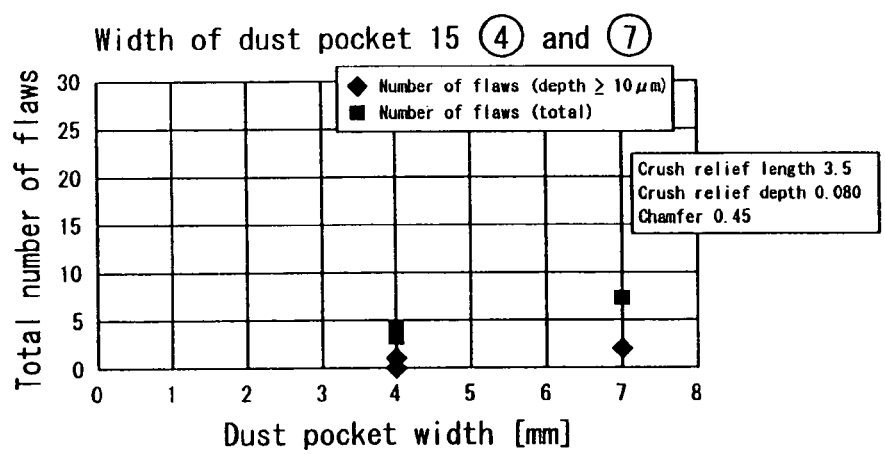
FIG. 14 is a diagram showing the test results of the foreign substance discharging ability of sliding bearings which depend on the width of a dust pocket 15.

Next, FIG. 14 shows the results of a test of the foreign substance discharging ability of the sliding bearing 5 conducted when the width of the dust pocket 15 of the sliding bearing 5 was varied, with the length of the dust pocket 15 kept constant. What can be said from the test results of FIG. 14 is that no great difference occurs in the foreign substance discharging ability of the sliding bearing 5 even when the width of the dust pocket 15 is varied.

It might be thought that this is because the effect of variation in the width of the dust pocket 15 did not exhibit itself seeing that the size of the foreign substances 14 discharged from the second lubricating oil passage 9 (5 to 8 mm in diameter) of the crank pin 1B is on the order of 1/10 of the diameter of the second lubricating oil passage 9 and the foreign substances 14 gather near the middle part of the bearing width (i.e., on the middle side of the second lubricating oil passage 9) due to the revolution of the crank pin 1B.

However, in order to positively capture large foreign substances within the dust pocket 15, it might be thought that it is preferred that the width of the dust pocket 15 be at least equal to the diameter of the second lubricating oil passage 9 of the crank pin 1B.

Although in the sliding bearing 3 of the first embodiment shown in FIGS. 1 to 5 above, the chamfered portions 11D, 12D are provided at the inner circumferential edges of the abutment surfaces 11A, 11B, 12A, 12B, these chamfered portions 11D, 12D may not be provided. The above-described dust pocket 15 may be omitted.

Furthermore, although in the above-described embodiment, the description was given of the case where the present invention is applied to the sliding bearing 5 as the con-rod bearing, it is needless to say that the present invention of the above-described configuration and dimensional setting can be applied also to the sliding bearing 3 as the main bearing.

DESCRIPTION OF SYMBOLS

| | |
|---|---|
| 1 Crankshaft (rotary shaft) | 2 Crankshaft |
| 3 Sliding bearing | 11, 12 Halved sliding bearing |
| 11A, 11B, 12A, 12B Abutment surface | |
| 11D, 12D Chamfered portion | 11E, 12E Crush relief |

The invention claimed is:

1. A cylindrical sliding bearing comprising a pair of half bearings having abutment surfaces abutting against each other to form the cylindrical sliding bearing, the half bearings having inner circumferential surfaces formed as sliding surfaces, crush reliefs are formed on the inner circumferential surfaces of the half bearings at positions adjoining the abutment surfaces, so that lubricating oil is supplied to the sliding surfaces, the depth and length of the crush reliefs being set such that a relative angle formed by the crush reliefs and the sliding surfaces at positions adjoining the crush reliefs is at least 0.69 degrees, and a dust pocket for housing foreign substances provided inside the crush reliefs in a circumferential direction and configured by notched portions formed from inside the crush reliefs to an axial middle side of the abutment surfaces, wherein the axial size of the notched portions forming the dust pocket is set at 30-70% of the axial size of the abutment surfaces, the depth of the notched portions being set at a value at least equal to a maximum size of foreign substances mixed in the lubricating oil, foreign substances that are smaller than the depth of the crush reliefs are discharged to outside the sliding bearing through the crush reliefs and foreign substances larger than the depth of the crush reliefs mixed in the lubricating oil are housed in the dust pocket.

2. The sliding bearing according to claim 1, wherein the length of the crush reliefs is set at 2 to 5 mm and the depth of the crush reliefs is set at 0.06 to 0.13 mm.

3. The sliding bearing according to claim 1, wherein chamfered portions are formed at inner circumferential edges of the abutment surfaces which provide boundaries with the crush reliefs, the notched portions are formed by notching an axial middle part of the chamfered portions, the depth of the notched portions is set on the order of five times the depth of the crush reliefs, and the chamfer size of the chamfered portions is 0.1 to 0.6 mm.

* * * * *